Feb. 2, 1937.  J. D. MATTIMORE  2,069,588
VALVE
Filed March 13, 1935  3 Sheets-Sheet 1

INVENTOR.
J. D. Mattimore
BY Albert J. Henderson
His ATTORNEY.

Feb. 2, 1937.  J. D. MATTIMORE  2,069,588
VALVE
Filed March 13, 1935  3 Sheets-Sheet 3

INVENTOR.
J.D.Mattimore
BY Albert J. Henderson
His ATTORNEY.

Patented Feb. 2, 1937

2,069,588

UNITED STATES PATENT OFFICE 2,069,588

VALVE

John D. Mattimore, Lynbrook, N. Y., assignor to Walworth Patents Inc., Boston, Mass., a corporation of Massachusetts Application March 13, 1935, Serial No. 10,805

4 Claims. (Cl. 137—21)

This invention relates to valves and more particularly to anti-freeze valves for liquid storage tanks and the like.

Practically all oil storage tank valve connections are subject to freezing in cold weather, this hazard being particularly common in connection with the out-of-door storage tanks in refineries. It is desirable that the storage tanks feed and drain from adjacent the bottom and the valve is consequently connected into the line at this point. All of these tanks contain a certain quantity of water which is usually collected in a suitable receptacle in the tank bottom and some means of drawing off this water is provided. Usually the head of oil in the tank is utilized to force the water up a short pipe to the valve which is opened to draw the water off when desired.

A similar condition arises when the valve is used solely to draw off oil below the level of such valve for purposes of cleaning or repairing the tank. In such a case the piping running from the valve downwards towards the bottom of the tank may may become filled with water up to the valve seat due to the head of oil in the tank.

Obviously when the valve is closed in severe weather there is danger of the water collecting in the tank bottom, settling in the valve structure and bursting it. It is, therefore, a primary object of this invention to protect the valve from damage by freezing.

Another object of the invention is to protect the valve operating mechanism from a similar hazard and from damage or destruction from other causes, such as settling of the tank.

Another object of the invention is to provide a simple means whereby the valve may be connected to the tank and the water or oil pipe connected to the valve.

Another object of the invention is to render the valve and its seat easily removable as a unit from exterior of the tank.

Other objects and advantages will become apparent from the following description taken in connection with the following drawings wherein:—

Figure 1:
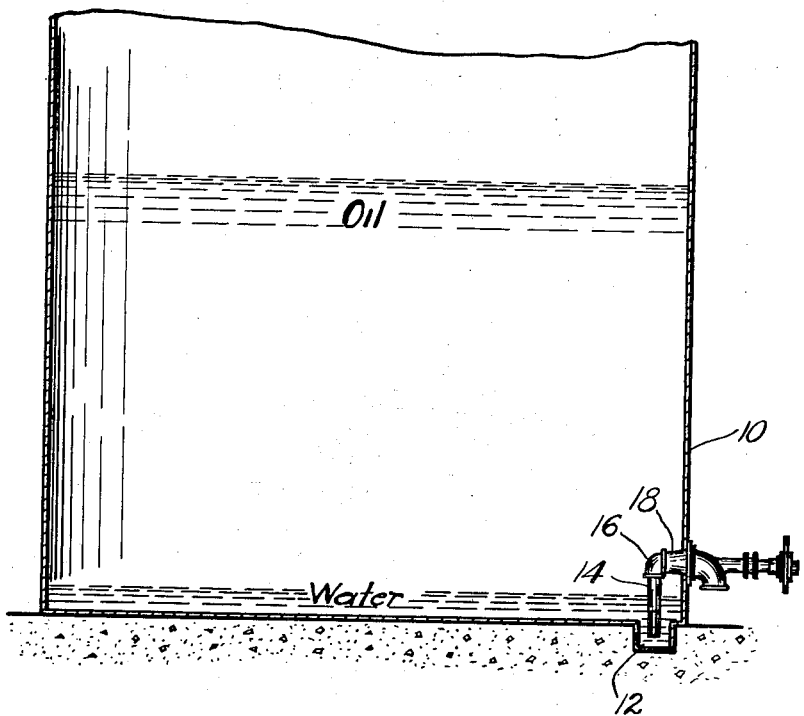
Fig. 1 is a longitudinal section view of a storage tank showing the valve and connections in position.

Referring more particularly to the drawings, the storage tank 10 is shown provided with a suitable receptacle or water pot 12 in its bottom into which projects a short length of pipe 14 connected by means of an elbow 16 to a tubular fitting 18 forming a part of the valve assembly. It will be observed from Fig. 1 and the following description that the parts described are housed within the tank 10 while the other parts to be presently described are on the exterior thereof.

Figure 2:
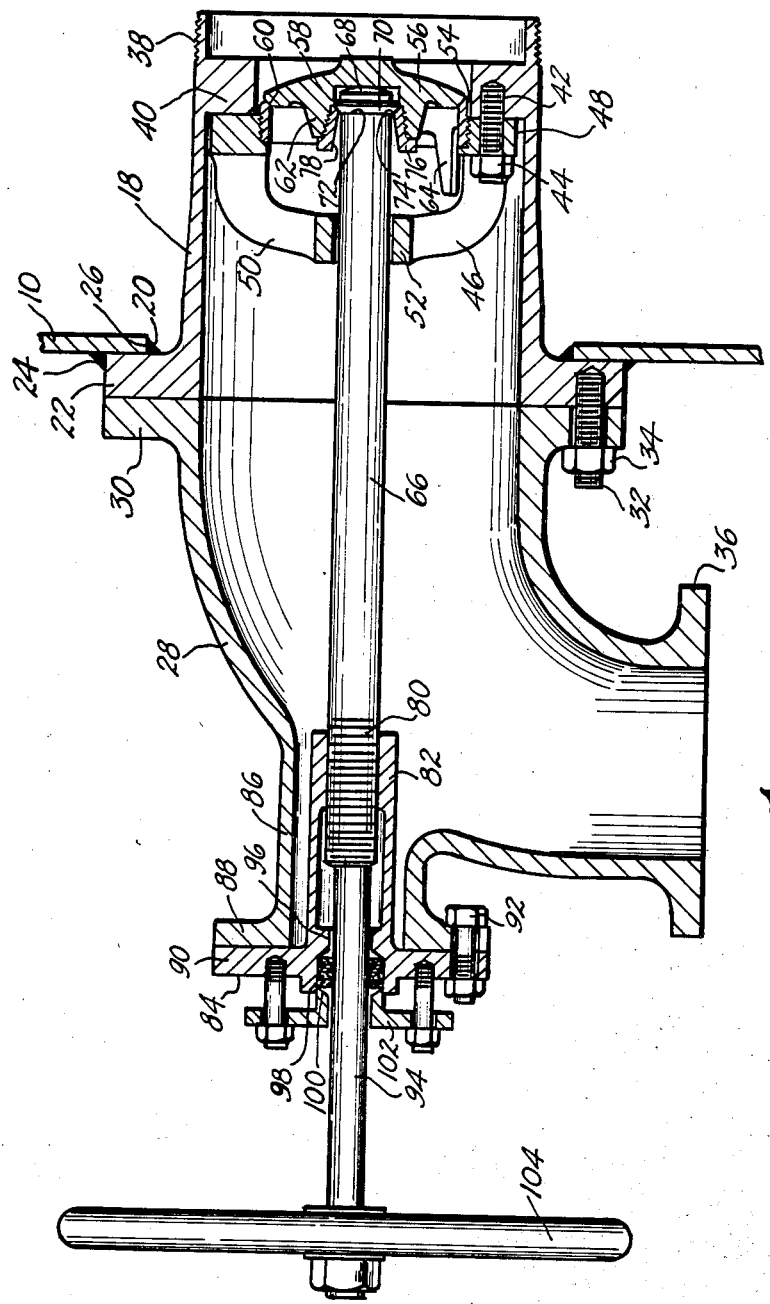
Fig. 2 is an enlarged longitudinal sectional view of the valve shown in Fig. 1

Reference may be had to Fig. 2 for illustrations of the valve parts now to be described and it will be noted that the tank 10 is provided with an opening 20 in the side wall thereof adjacent its bottom through which opening projects the tubular fitting 18. The tubular fitting 18 is provided with an external end flange 22 by means of which it may be welded, as at the points 24 and 26, to the tank wall. It will, however, be understood that the flange 22 may be secured to the tank wall 10 by other methods, such as by rivets or bolts, if desired. Secured to the tubular fitting 18 exterior of the tank is a second tubular fitting in the form of an elbow 28 having a flange 30 at one end secured to the flange 22, as by means of the studs 32 and nuts 34. A similar flange 36 is provided at the opposite end of the elbow 28 for securing it to a service pipe or the like (not shown).

From the foregoing description it will be apparent that the fittings 18 and 28 together form a continuous passageway for the fluid to flow from the interior to the exterior of the tank or vice versa and no nozzles or other pipe fittings are necessary to achieve this result. It will be observed, however, that the inner end of the tubular fitting 18 is threaded, as at 38, to permit connections for water draw-off, as in Fig. 1. The usual connections for oil draw-off or swing pipes (not shown) may also be made to the fitting as will be apparent.

In order to control the flow of fluid through the passageway formed by the fittings 18 and 28 a valve is incorporated therein. As shown in Fig. 2, the fitting 18 is provided with an annular internal flange 40 located well toward the inner end of the fitting and remote from the tank wall 10. Secured to the flange 40 as by means of the studs 42 and nuts 44 is a spider 46 having an integral annular flange 48 through which the studs 42 extend for the purpose described. The spider 46 may have any desired number of legs 50, the preferred number being three, of which only two are shown in the drawings. These legs 50 extend from the flange 48 to an integral hub portion 52 which is for a purpose to be described later.

Projecting from the flange 48 and threadedly secured thereto is a seat ring 54 upon which a valve member 56 is adapted to seat. The valve member 56, in this instance, comprises a head 58 having a peripheral seating surface 60 and an internally threaded hollow boss 62 projecting from the central portion thereof. The valve member 56 may be guided to its seat by means of fingers 64 formed integrally with the head 58 and boss 62 and cooperating with the interior periphery of the seat ring 64. Preferably, three such fingers are used, only one of which is shown in the drawings.

Suitable means are provided to move the valve member 56 to and from its seat. In this instance, an operating stem 66 extends through the fittings 28 and 18 and terminates in a rounded end 68 adapted to project into the hollow boss and engage the valve head 58. The operating stem 66 is preferably connected to the head 58 by means of a collar 70 which is formed in two halves and inserted in a suitable recess 72 formed in the stem 66 adjacent the rounded end 68. The outer edge of the collar 72 may be made of spherical form to engage a spherical or optionally conical seat 74 formed on a nut 76 which threadedly engages the boss 72 and thus serves to retain the stem 66 in position. The nut 76 is provided with a tapered bore 78 which is sufficiently large to permit lateral movement of the stem. In this manner the valve head 58 may tilt from its normal perpendicular relationship to the longitudinal axis of the stem 66 to insure engagement of the seat 60 with the seat ring 54. In this connection it may be pointed out that the hub portion 52 on the spider 46 is bored sufficiently large to permit slight misalignment of the stem 66 relative to the valve seat while at the same time affording some degree of support for the stem at this point.

In order to move the valve member 56 to and from its seat the stem 66 is threaded as at 80 for engagement with a threaded sleeve 82 projecting from the stuffing box 84. The sleeve 82 is housed within, but spaced from, an annular projection 86 opening from the side wall of the elbow 28 and terminating in a flanged end 88. The stuffing box 84 is provided with a flange 90 engaging the flange 88 and bolts 92 may be employed to secure these parts together.

The stem 66 is reduced as at 94 beyond the threaded portion 80 and is engaged by an inwardly flanged portion 96 on the stuffing box 84. The stuffing box may be provided with a bore 98 beyond the flange 96 for the reception of a packing 100 and the usual packing gland 102. A handwheel 104 may be secured to the stem beyond the gland 102 to effect rotation of the stem 66, and longitudinal movement thereof due to its threaded engagement with the sleeve 82. Thus the valve member 56 is moved to and from its seat.

From the foregoing description of the valve structure shown in Figs. 1 and 2 it will be apparent that when the elbow 16 and the pipe 14 are connected to the thread 38 on the tubular fitting 18 the head of oil will force the water from the water pot 12 up against the valve member 56 and its seat. As this seat is some distance inside the tank wall and the parts described are surrounded by oil having the usual insulating properties, the water will not freeze back of the valve and prevent it from being opened. Consequently, the danger of the valve assembly bursting after severe weather is entirely eliminated by this construction in a simple and efficient manner.

It will also be apparent that should the tank settle causing the elbow 28 to move upward relative to tubular fitting 18 thereby opening up the joint between flanges 22 and 30 and bending stem 66, seat 60 can still make engagement with seat ring 52, thereby preventing the tank being drained of its contents.

Figure 3:
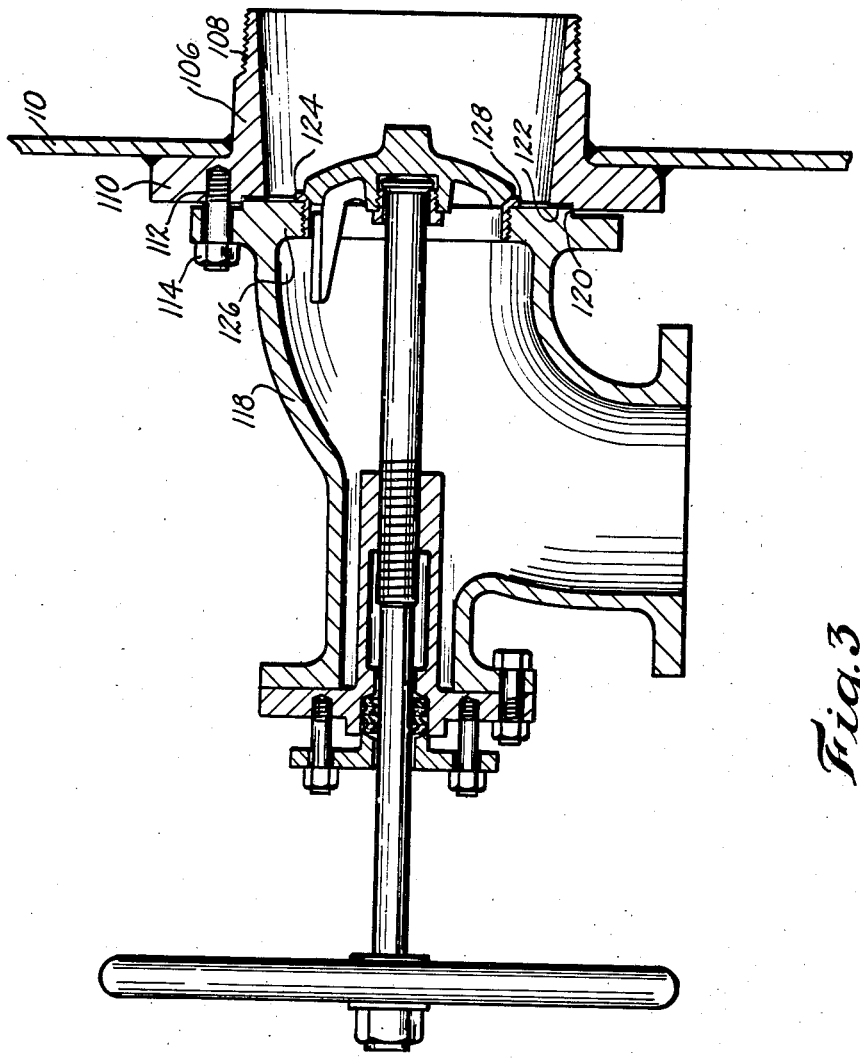
Fig. 3 is a longitudinal sectional view of an alternative form of valve assembly.

The valve assembly shown in Fig. 3 may be used as an alternative to that shown in Fig. 2, particularly in storage tanks located in bulk terminals where the danger of freezing is usually more remote. It should be noted, however, that this construction is not limited to such uses, but may also be used in any liquid storage tank installation with equal facility, as will be hereinafter pointed out. In this construction a tubular fitting 106 provided with a threaded end 108 similar to the previous embodiment is secured by means of a flange 110 to the tank wall 10. In this instance, also, the connection between the flange 110 and the tank wall may be made by welding, bolting or riveting as desired. Secured to the flange 110, as by means of studs 112 and nuts 114, is a tubular fitting in the form of an elbow 118, the two fittings together forming a continuous passageway for the fluid to flow to and from the tank, as in the previously described embodiment. The joint 120 between the elbow 118 and the tubular fitting 106 is, in this instance, of the male and female type and a gasket 122 of metal or other suitable material may be used between the joint faces as shown.

The valve seat in this embodiment is located outside the tank wall 10 by an amount equal to the thickness of the flange 110, this valve seat being formed on a seat ring 124 secured to an internal annular flange 126 formed on the inner end of the elbow body 118. The seat ring 124 is in the form of an annulus having its outer periphery threadedly engaging the flange 126 and being provided with an enlarged head 128 engaging the inner face of the flange 126.

The remaining elements of the valve assembly shown in Fig. 3 may be identical with those shown in Fig. 2. Hence, further description of the alternative embodiment of the invention is deemed unnecessary as reference may be had to the description of the embodiment shown in Fig. 2.

It will be observed that the location of the valve seat in the alternative form of invention shown in Fig. 3 insures that any ice which may form in severe weather will be inside the tank. This condition is most liable to occur, if it occurs at all, when the valve is piped, as previously described, for use as a water draw-off valve or as a means of drawing off oil or other liquid below the valve level. It will be apparent, therefore, that any ice which may form in the tubular fitting 106 will expand toward the elbow 16 and pipe 14 and as this pipe is open at the bottom the expansion may take place without hazard to the valve connections.

It may be pointed out that in both embodiments there are no pockets in the tubular fittings wherein water may collect and freeze and cause undue stress. The valve operating mechanism, and particularly the threaded part thereof, is protected from damage by being housed within the tubular fitting. When desired, the valve seat or the valve member may be renewed or reground merely by reducing the level of the liquid in the tank below the tubular fitting and thus permitting the valve parts to be removed as a unit from outside the tank. This eliminates the necessity of entering the tank in order to obtain access to the valve parts which is always a costly and lengthy procedure, due to the necessity of ridding the tank of poisonous fumes before it can be entered.

It will thus be seen that novel means have been employed to accomplish all the objects of the invention. The valve is of simple construction, having a housing consisting essentially of but two parts, rendering the valve economical to manufacture and use.

I claim:

1. A valve assembly for liquid storage tanks comprising in combination, a pair of tubular fittings, one fitting having a flange for securing it to the exterior of the tank wall with one end of said fitting projecting within the tank, the other said fitting having a flange for detachably securing it to the first said fitting externally and independently of said tank, said fittings together forming between the ends thereof a continuous passageway from the interior to the exterior of the tank, an annular valve seat projecting from one of said fittings into the passageway adjacent the tank wall, a valve stem extending longitudinally through the passageway from externally of the tank and terminating at its inner end opposite the valve seat, a valve member secured to the said inner end of the stem and movable therewith into engagement with the valve seat for closing the said passageway, and a pipe connection on the said end of the fitting within the tank whereby liquid may be conveyed from the tank up part of said passageway to the valve seat for discharge through the remaining portion of said passageway when the valve member is disengaged from said seat.

2. A valve assembly for liquid storage tanks comprising in combination, a pair of tubular fittings, one fitting having a flange for securing it to the exterior of the tank wall with the inner end of said fitting projecting within the tank, the other said fitting having a flange for detachably securing it to the first said fitting externally and independently of said tank, said fittings together forming between the ends thereof a continuous passageway from the interior to the exterior of the tank, an annular flange projecting from the inner end of the first said fitting into the passageway, a valve seat secured to said annular flange, a valve stem extending longitudinally through the passageway from externally of the tank and terminating at its inner end opposite the valve seat, a valve member secured to the said inner end of the stem and movable therewith into engagement with the valve seat for closing the said passageway, and a pipe connection on the said inner end of the fitting within the tank whereby liquid may be conveyed from the tank up part of said passageway to the valve seat for discharge through the remaining portion of said passageway when the valve member is disengaged from said seat.

3. A valve assembly for liquid storage tanks comprising in combination, a pair of tubular fittings, one fitting having a flange for securing it to the exterior of the tank wall with the inner end of said fitting projecting within the tank, the other said fitting having a flange for detachably securing it to the first said fitting externally and independently of said tank, said fittings together forming between the ends thereof a continuous passageway from the interior to the exterior of the tank, an annular flange projecting from the inner end of the first said fitting into the passageway, a spider secured to said flange, a valve seat carried by said spider, a valve stem extending longitudinally through the passageway from externally of the tank and terminating at its inner end opposite the valve seat, said inner end of the stem being guided and supported by said spider, a valve member secured to the said inner end of the stem and movable therewith into engagement with the valve seat for closing the said passageway, and a pipe connection on the said inner end of fitting within the tank whereby liquid may be conveyed from the tank up part of said passageway to the valve seat for discharge through the remaining portion of said passageway when the valve member is disengaged from said seat.

4. A valve assembly for liquid storage tanks comprising in combination, a pair of tubular fittings, one fitting having a flange for securing it to the exterior of the tank wall with one end of said fitting projecting within the tank, the other said fitting having a flange for detachably securing it to the first said fitting externally and independently of said tank, said fittings together forming between the ends thereof a continuous passageway from the interior to the exterior of the tank, an annular flange projecting from the second said fitting into the passageway adjacent the tank wall, a valve seat secured to said annular flange, a valve stem extending longitudinally through the passageway from externally of the tank and terminating at its inner end opposite the valve seat, a valve member secured to the said inner end of the stem and movable therewith into engagement with the valve seat for closing the said passageway, and a pipe connection on the said end of the fitting within the tank whereby liquid may be conveyed from the tank up that part of the passageway formed by the first said fitting to the valve seat for discharge through the remaining portion of said passageway when the valve member is disengaged from said seat.

JOHN D. MATTIMORE.